Feb. 25, 1958 E. A. NEUGASS 2,824,399
ILLUMINATED PANELS
Filed Nov. 24, 1954 2 Sheets-Sheet 1
FIG. 1
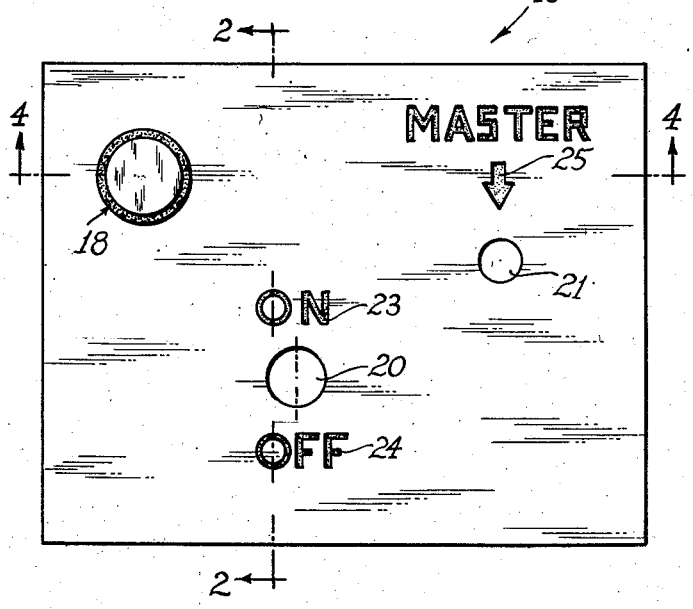
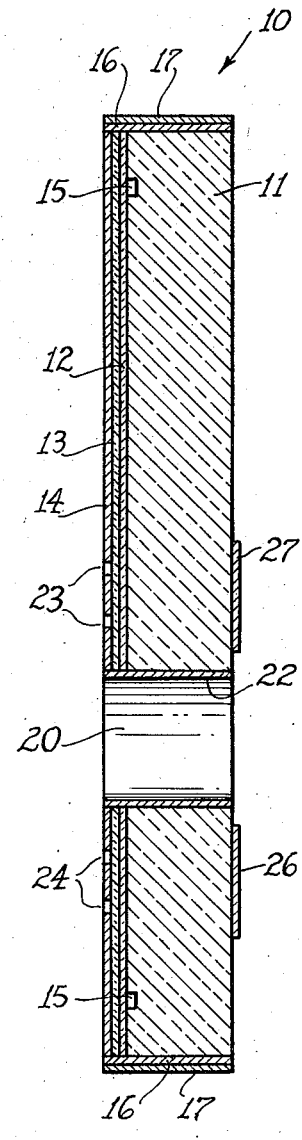
FIG. 2
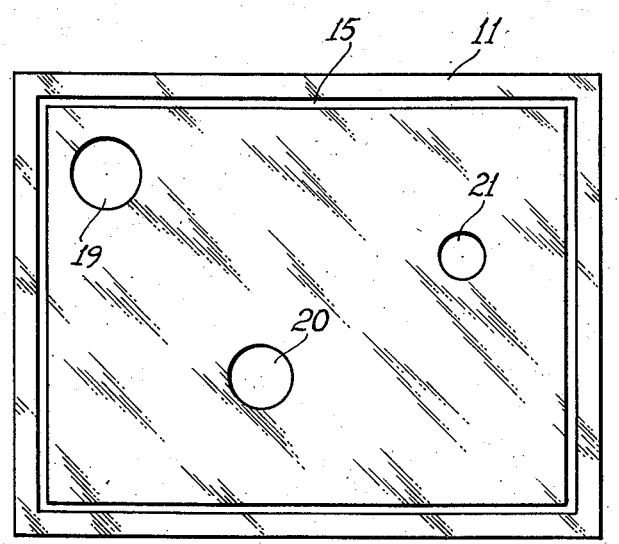
FIG. 3
INVENTOR
EDWIN A. NEUGASS
BY
ATTORNEY

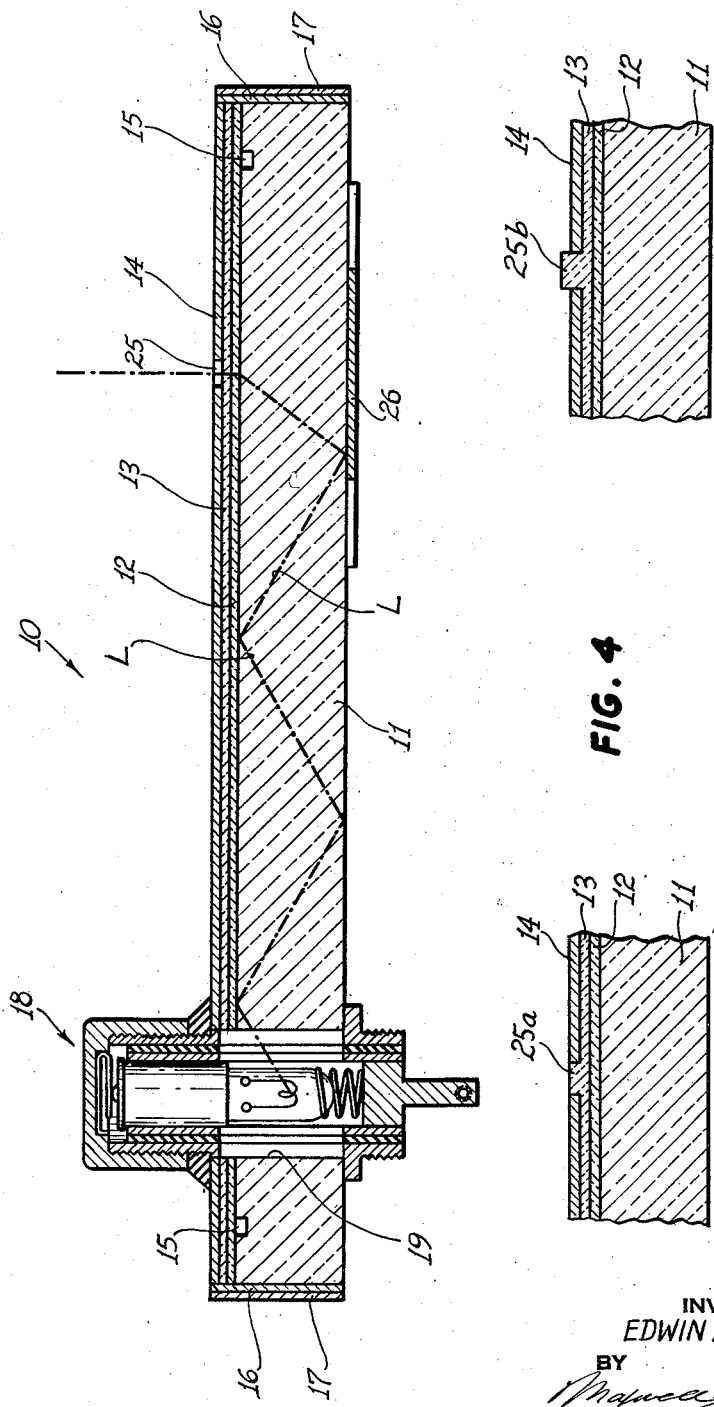

United States Patent Office 2,824,399
Patented Feb. 25, 1958

2,824,399

ILLUMINATED PANELS

Edwin A. Neugass, Poteau, Okla.

Application November 24, 1954, Serial No. 470,997

12 Claims. (Cl. 41—22)

The present invention relates generally to illuminated panels, and is particularly directed to improvements in illuminated instrument panels and the like, for example, in airplanes, wherein the panel is edge or transilluminated.

Heretofore, panels of the described character have been provided, for example, as in United States Letters Patent No. 2,518,726, issued August 15, 1950, to Charles N. Shlenker, wherein the panel includes a body or sheet of transparent or light transmitting material, a layer of translucent material covering and bonded to at least the front surface of the transparent body and an outer layer of opaque material covering and bonded to the translucent layer, with openings being formed in the opaque layer at the front of the panel to expose the underlying portions of the translucent layer, and with light being admitted to the transparent body, either at the edge of the body or at locations within the latter, to be transmitted through the body in the plane of the panel for transilluminating the front translucent layer at the openings in the opaque layer at the front of the panel. Such panels, in addition to the translucent layer on the front surface of the transparent body and the superposed opaque layer, may have a translucent layer bonded to the back surface of the transparent body and a rear, imperforate opaque layer over the last mentioned translucent layer. In either case, that is, a panel including a transparent body and translucent and opaque layers only at the front thereof or a transparent body and such layers at both the front and back thereof, the body and several layers are bonded together, or laminated over their entire confronting surface. In such panels, the transparent body may be formed of clear methyl methacrylate, known as "Lucite," but by reason of the bond between the confronting surfaces of the translucent layers, which are preferably white, and the transparent body, the internal reflection characteristics of the "Lucite" are not utilized in promoting the travel of the light rays from the source thereof through the transparent body. That is, as light rays, which diverge from the source thereof, seek to escape from the front and rear surfaces of the transparent body, such rays are deflected back into the body by the white translucent layers rather than by total reflection off the front and rear surfaces of the body. So long as one or more of the surfaces of the transparent body is in bonded contact over its entire area with the adjacent white translucent layer, the transparent body does not provide internal reflections of the light and the deflection or reflection of light by the translucent layer decreases the distance from the source at which light of adequate intensity is available as well as the intensity of illumination at intermediate locations.

Accordingly, it is an object of the invention to provide an illuminated panel which includes a transparent sheet or body to which light is admitted, a layer of translucent material in front of the transparent body and an opaque outer layer over said translucent layer, and wherein internal reflection is achieved within the transparent body thereby to improve the transmission of light through said body.

Further, it is an object to provide a panel of the above described character wherein transillumination of the translucent layer in front of the transparent body is intensified at those locations where the outer opaque layer has openings therethrough.

In accordance with the invention, the above, and other objects, features, and advantages thereof appearing in the following detailed description of an illustrative embodiment, are achieved by providing a panel which includes a sheet or body of transparent material, preferably having polished front and rear surfaces, and serving as a light carrier, a layer of translucent material supported by a relatively thin layer of transparent material which is disposed over the front surface of the transparent body and free of the latter, except adjacent the edges of the panel, where the thin transparent layer is adhesively secured to the light carrying body and an outer layer of opaque material bonded or laminated over the translucent layer and having indicia defining or other openings therethrough exposing the underlying portions of the translucent layer, the thin transparent layer and the translucent and opaque layers carried thereby forming, in effect, a stencil, with means being associated with the panel to admit light to the transparent body, whereby such light is internally reflected from the front and rear surfaces of the body to be transmitted through the latter from the location of the light source.

According to a further feature of the invention, white paint is applied to areas of the rear surface of the transparent body in back of the openings of the front opaque layer thereby to increase transillumination of the corresponding portions of the translucent layer for intensifying the illumination of the indicia and the like defined by said openings.

Another advantage of the panel construction embodying the invention resides in the fact that the gluing of the edge portions of the stencil to the light carrying body provides a seal around the space between the light carrying sheet or body and the thin supporting layer of the stencil to exclude moisture from that space so that the internal reflection in the light carrying body will not be adversely affected by wetting of the surface thereof.

In order that the invention may be fully understood, an illustrative embodiment thereof is described in detail below and shown in the accompanying drawings, wherein:

Fig. 1 is a front elevational view of an illuminated panel embodying the present invention;

Fig. 2 is a vertical sectional view taken along the line 2—2 of Fig. 1, but on an enlarged scale;

Fig. 3 is a front elevational view of a body included in the panel of Fig. 1;

Fig. 4 is a fragmentary sectional view of the panel of Fig. 1 diagrammatically illustrating the travel of light rays through the latter, and taken along the line 4—4 of Fig. 1;

Fig. 5 is a fragmentary, sectional view of another embodiment of the invention; and Fig. 6 is a view similar to Fig. 5, but showing still another embodiment of the invention.

Referring to the drawings in detail, an illuminated panel embodying the present invention is there illustrated and generally identified by the reference numeral 10. As seen in Figs. 2 and 4, the panel 10 includes a relatively thick sheet or body 11 of clear, transparent light-transmitting material, preferably plastic, such as, for example, a material selected from the class of acyclic resins and their polymers and copolymers, methyl methacrylate being preferred, although other light transmitting material, such as quartz may be employed. Preferably, the front and rear surfaces of the body 11 are highly polished, so that, when light is admitted to said body either at the edges thereof or at a location spaced from the edges in the manner hereinafter described, the light rays are transmitted through the body from the light source and total reflection of the light rays is obtained at the front and rear surfaces of the body thereby to promote the transmission of the light rays to locations remote from the light source. Thus, body 11 functions as a light carrier.

Panel 10 further includes a three-layer lamination made up of the layers 12, 13 and 14 and forming a stencil. Layer 12 is a clear, transparent layer or film which is provided merely for the purpose of supporting and stiffening the relatively thin layers or coatings 13 and 14. Layer 13 is a translucent, preferably white, layer, while layer 14 is of an opaque, preferably black or dark colored, material. The layers 12, 13 and 14 are preferably formed of plastic materials, such as, for example, of the class of polyvinyl or vinyl resins, their polymers or co-polymers, with at least the outer, opaque layer 14 being substantially flexible, by the introduction of suitable plasticizers in the plastic material of which it is formed. Further, the outer or exposed surface of the opaque layer 14 preferably has a matte finish to prevent the reflection of ambient light therefrom.

The layers 12, 13 and 14 are superposed one on top of the other and secured together over their entire confronting surfaces to provide a single or integral lamination. Such lamination may be performed by coating the confronting surfaces to provide a single or integral lamination. Such lamination may be performed by coating the confronting surfaces of such layers with an adhesive, and then passing the superposed layers through a set of rolls which squeeze any excessive adhesive and disperse the latter uniformly over the entire area to assist in bonding the layers to each other. Another method, and the preferred one, is to place the superposed layers 12, 13 and 14 in a press having heated platens, thereby to bond the three layers together by means of heat and pressure.

The three-layer lamination or stencil and the body 11 are then fabricated to suitable size and shape, and the three-layer lamination or stencil is adhesively secured to the front surface of body 11 only along the edge portions of the latter, with the three-layer laminations being disposed so that the opaque layer 14 defines the front surface of the assembled panel and the transparent or clear layer 12 confronts the front surface of the transparent body 11. The three-layer lamination, consisting of the layer 12, 13 and 14, is secured to the light transmitting body 11 by applying a suitable adhesive or glue, for example, an acrylic resin glue or cement, to the front surface of the body 11 along the edges of the latter and then superposing the three-layer lamination on the front surface of the body with suitable pressure being applied to assist in obtaining a secure bond. In order to limit and define the zone of adhesive attachment of the rear surface of layer 12 to body 11, the body 11 is formed, as by engraving, with a continuous groove 15 in the front surface thereof and extending parallel and adjacent to the edges of the body 11 (Figs. 2, 3 and 4). Thus, the adhesive for securing together the three-layer lamination and the body 11 is applied to the front surface of the latter only between the groove 15 and the adjacent edges of the body, and the groove 15 acts to contain and collect any excess adhesive which is squeezed inwardly during the bonding together of the lamination and the body. It has been found that a groove spaced ⅛ of an inch from the edges of body 11 and having a depth and width of ¹⁄₁₆ of an inch is suitable for the above purposes.

In order to prevent the escape of the light admitted to body 11 from the edges of the panel, such edges of the panel are preferably coated first with a white coating 16 and then with an outer black or dark colored coating 17 (Figs. 2 and 4) whereby light rays seeking to escape from the edges of the panel are reflected back into the latter by the white edge coating 16.

As previously indicated, light may be admitted to the light transmitting body 11 either at an exposed portion of the edge thereof, or by a light emitting fixture, generally identified by the reference numeral 18 which is inserted in a suitable opening 19 extending through the three-layer lamination and the body 11. The light emitting fixture 18 may be the same as that described in United States Letters Patent No. 2,518,726, issued on August 15, 1950, to Charles N. Shlenker, and there described as being manufactured by the Grimes Manufacturing Co., Urbana, Ohio, under part No. A4295, so that a destailed description thereof is unnecessary in the present disclosure. In either case, that is, whether illumination is provided by edge lighting of the body 11 or by a light emitting fixture extending into the body, the body 11 serves to convey or transmit the light rays from the source thereof in the direction generally parallel to the plane of the panel.

In fabricating the panel 10, additional holes may be formed therethrough, as at 20 and 21, to permit the passage through the panel of operating shafts or members for switches and the like which are to be mounted behind the panel. As seen in Fig. 2, such openings extending through the panel are preferably provided with opaque coatings 22 in order to prevent the escape of light from the panel at the related opening. Further, suitably shaped, indicia defining openings are formed through the front opaque layer 14, as at 23, 24 and 25, thereby to expose the underlying portions of the translucent layer 13. When light is admitted to the body 11, for example, by the source or fixture 18, body 11 transmits the light rays throughout the extent of the panel, and transilluminates the portions of the translucent layer 13 exposed by the openings 23, 24 and 25 in the front opaque layer 14.

In panels embodying the invention, the portions of the translucent layer 13 exposed at the openings 23, 24 and 25 can be flush with the rear surface of layer 14, as in Figs. 2 and 4, or flush with the front surface of the opaque outer layer, as at 25a on Fig. 5, or even protruding beyond the front surface as at 25b on Fig. 6, to provide improved visibility of the illuminated indicia, and in the last case the rubbery characteristic of the vinyl forming layer 13 prevents breaking-off of the protruding portions.

Since in the panel embodying the present invention the front and rear surfaces of the light transmitting body 11 are substantially free, except at their edge portions, of any layers confronting such surfaces, for example, the layer 12, internal reflection of the light rays is obtained within the body 11 thereby to promote the efficient transmittal of light through the body to locations which are relatively far from the light source 18. In order to ensure illumination of substantially uniform intensity at the various indicia defining openings 23, 24 and 25, regardless of the different distances between such openings and the light source, the areas of the back surface of body 11 registering with the indicia defining openings which are relatively remote from the light source, for example, the openings 24 and 25, are provided with white, light reflecting coatings 26 thereby to promote, and increase the intensity of, the transillumination of the translucent layer 13 exposed at such openings, while the areas of the back or rear surface of body 11 registering with the indicia defining openings which are disposed relatively close to the light source, for example, the opening 23, are provided with dark colored, for example, black, coatings 27 thereby to discourage or reduce the intensity of the transillumination of the related portions of translucent layer 13. As seen in Fig. 4, the white coating 26 acts to increase the angle of reflection of a light ray L impinging thereagainst so that when the light ray in question again strikes the front surface of body 11, it does so at an angle which is sufficiently large to provide for the escape of the light ray into the layers 12 and 13.

On the other hand, the dark or black coating 27 tends to absorb light rays striking thereagainst to provide a decrease in the intensity of illumination of the related portion of layer 13. It is apparent that, by the judicious use of the light and dark coatings 26 and 27 on areas of the back surface of body 11, a substantially uniform intensity of illumination can be provided at all of the indicia defining openings thereby to permit a reduction in the general level of illumination without sacrificing the extent of the visibility of the particular indicia. This reduction in the general level of illumination, by avoiding any excessively bright illumination at localized areas of the panel, is valuable in that it ensures a minimum of interference with the general or night vision of the pilot or observer.

While the panel 10 described above and illustrated in the drawings includes a three-layer lamination only in front of the body 11, it is to be understood that a similar three-layer lamination may be provided in back of the light-transmitting body to prevent the escape of light from the rear surface of that body. However, here again it is apparent that the back three-layer lamination must be free of the rear surface of body 11, except along the edges of the latter, to obtain internal reflection of the light rays by the front and rear surfaces of the body and the corresponding improvement in the transmission of light through the body.

Further, it is apparent that the glue or cement securing the stencil to the light carrying body provides a seal around the edges of the space between the confronting surfaces of layer 12 and body 11 and prevents the entrance of moisture into that space so that wetting of the surface of body 11, and a consequent reduction in the internal reflection of light within body 11, is thereby avoided.

While a particular embodiment of the invention has been described in detail and illustrated in the accompanying drawings, merely by way of example, the invention is not limited to that precise embodiment, and various changes and modifications can be effected therein, by one skilled in the art, without departing from the scope or spirit of the invention as defined in the appended claims.

What is claimed is:

1. A panel comprising a transparent, light-transmitting body, a layer of translucent material and an opaque layer covering one side of said translucent layer and secured to the latter over substantially its entire area to form a lamination, said lamination formed by said translucent and opaque layers being disposed in front of said transparent body with said translucent layer facing toward the front surface of said body, glue securing said lamination to the front surface of the body only along the edge portions of said front surface so that said translucent layer is free of said light transmitting body over substantially its entire area thereby to avoid any substantial reduction in the internal reflection from said front surface of the body, said opaque layer having at least one opening therethrough exposing the underlying portion of said translucent layer, and means for admitting light to said transparent body to transilluminate the exposed portion of said translucent layer.

2. A panel comprising a transparent, light-transmitting body, a lamination disposed in front of said body and glued to the front surface of the body only along the edges of the latter, said lamination is free of the front surface of the body over substantially the entire area thereof so that internal reflection from said front body surface is not appreciably reduced, said lamination including an outer opaque layer and an underlying translucent layer, said opaque layer having at least one opening therethrough exposing the underlying portion of said translucent layer, and means for admitting light to said transparent body to be carried by the latter and transilluminate the exposed portion of said translucent layer.

3. A panel according to claim 2; wherein said lamination further includes a supporting transparent layer interposed between the front surface of said transparent body and said translucent layer and bonded to the latter over substantially the entire area thereof.

4. A panel according to claim 2; wherein at least said opaque layer is of a flexible, resilient material to resist chipping and scratching thereof.

5. A panel according to claim 2; wherein said opaque layer has several openings therethrough at varying distances from said light-admitting means, and further including a light reflecting coating on the back surface of said body and extending over an area registering with the openings through said opaque layer which are relatively remote from said light-admitting means thereby to intensify the transillumination of the portions of said translucent layer exposed at said openings relatively remote from the light transmitting means.

6. A panel according to claim 5; further including a light absorbing coating on the back surface of said body and extending over an area registering with the openings through said opaque layer which are relatively close to said light-admitting means thereby to reduce the intensity of transillumination of the translucent layer at the portion of the latter exposed by said openings relatively close to the light admitting means.

7. A panel according to claim 2; wherein said opaque layer has several openings therethrough at varying distances from said light transmitting means, and further including means on the back surface of said body effective to intensify and reduce the intensity of transillumination of said translucent layer at the portions thereof which are exposed by the openings through the opaque layer disposed remote from, and close to, respectively, said light-admitting means.

8. A panel according to claim 2; wherein said body has a continuous groove in the front face thereof extending along and adjacent to the edges of the body, the glue for securing the laminations to said body being disposed between the portion of said front face outside of said groove and said lamination, whereby said groove prevents inward spreading of the glue from the edge portions of the body.

9. A panel according to claim 2; further comprising light sealing means extending over the back surface of said body and free of the latter over substantially its entire area thereby to prevent the escape of light from said back surface of the body.

10. A panel according to claim 9; wherein said light sealing means includes a rearmost opaque layer and a light colored translucent layer bonded to the front surface of said rearmost opaque layer.

11. A panel comprising a transparent, light-transmitting body, stencil means extending across the front face of said body and glued to said front surface only adjacent the edges thereof so that said stencil means is free of said front surface over substantially the entire area thereof to avoid any appreciable reduction in the internal reflection of light by the faces of said body, said stencil means having light emitting portions, and means for admitting light to said body so that the latter carries the light from said means to said light emitting portions of the stencil means.

12. A panel according to claim 11; wherein said light emitting portions of the stencil means are disposed at varying distances from said light admitting means, and further comprising means on the back face of said body operative to equalize the intensity of illumination at the several light emitting portions of said stencil means.

References Cited in the file of this patent
UNITED STATES PATENTS

| | | |
|---|---|---|
| 2,421,277 | Luce | May 27, 1947 |
| 2,518,726 | Shlenker | Aug. 15, 1950 |
| 2,561,672 | Pritikin | July 24, 1951 |
| 2,582,786 | Malby | Jan. 15, 1952 |
| 2,663,107 | Moler | Dec. 22, 1953 |
| 2,712,188 | Neugass | July 5, 1955 |